Dec. 5, 1961 J. MACHLIS ET AL 3,012,242
F.M. RADAR SCORING SYSTEM
Filed May 19, 1958 4 Sheets-Sheet 1

INVENTORS:
Jerome Machlis
George L. Hatchett

By Willard M. Graham
Agent

INVENTORS:
Jerome Machlis,
George L. Hatchett

By Willard M. Graham
Agent

INVENTORS:
Jerome Machlis
George L. Hatchett

United States Patent Office 3,012,242
Patented Dec. 5, 1961

3,012,242
F. M. RADAR SCORING SYSTEM
Jerome Machlis, Granada Hills, and George L. Hatchett, Canoga Park, Calif., assignors to Northrop Corporation, a corporation of California
Filed May 19, 1958, Ser. No. 736,305
13 Claims. (Cl. 343—14)

The present invention relates to means and method for determining if a missile comes close enough to a target to be termed a "hit" or not, and more particularly, to a narrow band FM radar scoring system for indicating by a predetermined signal when a high-speed missile comes within a definite, but easily adjustable, distance from an air-borne target.

It is common knowledge in the radar field that the distance to an object may be determined by radiating a frequency-modulated radio wave toward the object, receiving reflections of the wave therefrom, and comparing the reflected waves with waves received directly from the source of the radiation.

However, several factors make the ordinary applications of this principle unsuitable for determining accurately the "miss distance" of a relatively small, high-velocity missile, such as a rocket for example. These will be referred to in the course of the following specification.

The present invention utilizes a new method of comparison of these combined waves.

It is an object of this invention to provide an improved FM radar scoring system having an accurate and sharp range cut-off, or positive indication of the approach of a fired projectile within a predetermined distance from the target carrying the apparatus of the invention.

Another object of the present invention is to provide such a detector which discriminates against stationary or slow moving objects, so that improper or undesired actuation of the system output will be prevented.

Further objects are to enable immediate hit indication (within the predetermined miss-distance), to provide a simple and economical scoring system, and to render the system independent of signal strength variations, including antenna gain variations and back scattering cross sections variations of the missile.

Briefly, our invention makes use of the spectral component range characteristics in the reflected FM signal received from the missile when fired at the target. The target, which may be a radio-controlled drone aircraft, for example, carries the transmitting and receiving equipment which mixes a direct and reflected wave and separates particular frequency components of the resulting mixed waveform. One of the signal components thus obtained is the Doppler frequency by itself. Other frequency components present in the mixer output are the various harmonics of the transmitter modulating frequency plus and minus the Doppler frequency. This invention resides in determining the amplitude ratio of one of the latter harmonics to the amplitude of the independently separated Doppler frequency wave component only, which ratio, as received, is a unique function of the range or distance between the missile and the target. Expressed by means of Bessel functions, this is equivalent to measuring the ratio of a term such as the $J_2$ term in the Bessel series, for example, to the $J_0$ term. When this ratio decreases to a value corresponding to a predetermined "hit" range, a trigger circuit operates sequencing means, for example, to release a flare, smoke puff, or the like, indicating a hit.

The selected harmonic component in the above operation is demodulated after its isolation, to provide an A.C. signal having the same frequency as the Doppler frequency, for further handling. Converting these latter A.C. signals into further signals proportional to the logarithms of the input amplitudes, and then subtracting the logarithm signals, produces the desired quotient, or ratio.

The present invention will be more fully understood by reference to the following description of a preferred embodiment, and to the accompanying drawings, in which.

Figure 1:
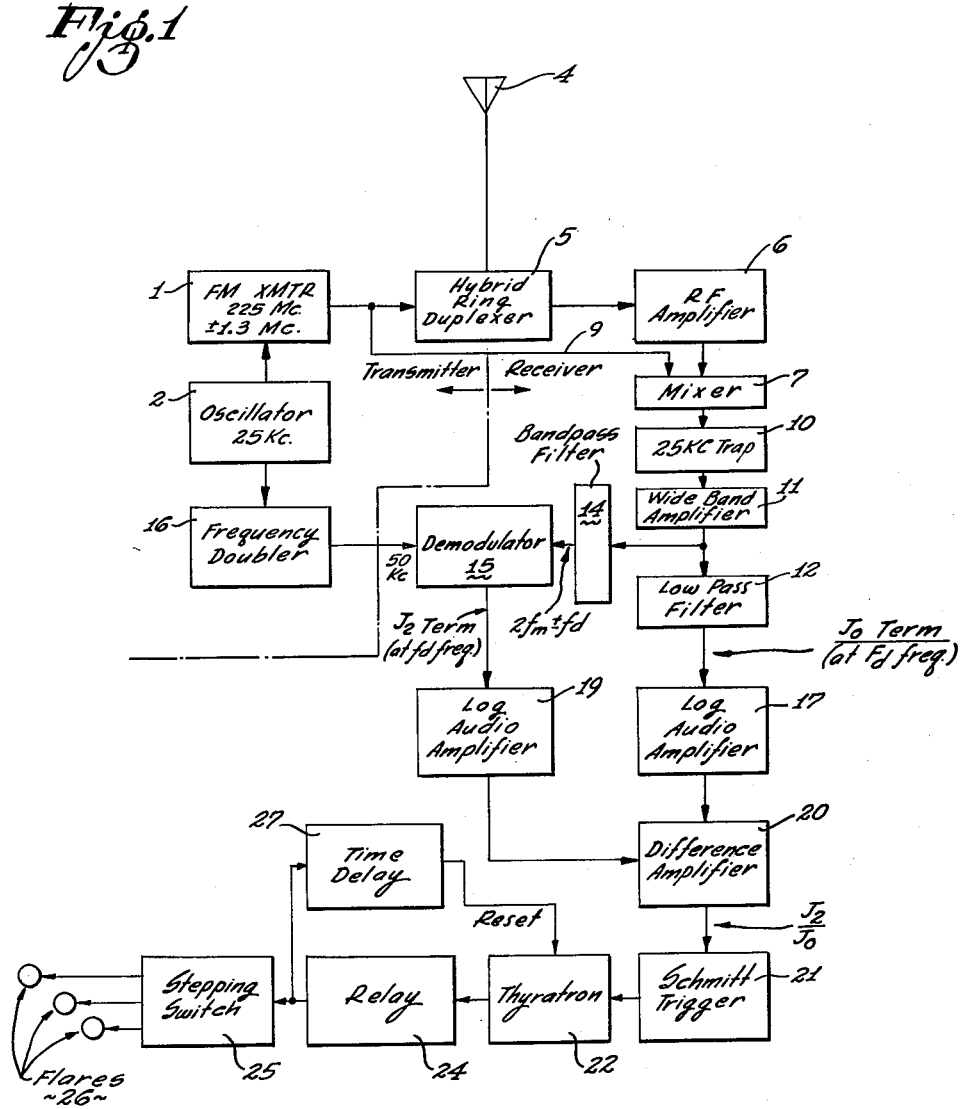
FIGURE 1 is a block diagram of our complete detector and indicator system, showing the components and manner of connection thereof to measure the desired signal ratio.

Referring first to FIGURE 1 for a description of a particular apparatus arrangement embodying this invention, a transmitter 1 having a carrier frequency of 225 megacycles per second is frequency modulated at a rate of 25 kilocycles per second by a stable oscillator 2 to a frequency deviation of plus and minus 1.3 megacycles per second. Transmitter output is fed to an omnidirectional turnstile antenna 4 through a hybrid ring duplexer 5 to isolate antenna-received signals from the transmitter 1 and to isolate direct transmitter output from a radio-frequency amplifier 6 connected to the duplexer 5. A balanced mixer 7 mixes the received signals from the RF amplifier 6 with a portion of the transmitted signal through a direct path 9.

Thus, the mixer 7 produces sum and difference frequency signals from the transmitter 1 and the signal reflected from an object in the vicinity of the antenna 4. A brief derivation of the resulting frequency components and waveforms will now be described, using the following symbol meanings:

$e_t$ = instantaneous transmitter voltage
$E_t$ = peak transmitter voltage
$f_c$ = carrier frequency
$\Delta f$ = frequency deviation
$f_m$ = modulating frequency
$R$ = range in feet
$c$ = velocity of electromagnetic propagation
$e_r$ = instantaneous received voltage
$E_r$ = peak received voltage
$e_{diff.}$ = instantaneous difference frequency signal voltage out of the receiver
$K$ = receiver gain
$J_n(M)$ = $n$th order Bessel function of the first kind with argument M
$v$ = radial velocity of the reflecting object
$f_d$ = Doppler frequency
$P_r$ = received power
$P_t$ = transmitted power
$G_r$ = gain of receiving antenna
$G_t$ = gain of transmitting antenna
$\lambda$ = transmitted wavelength
$\sigma$ = back scattering cross section of the reflecting object A sinusoidal frequency-modulated transmitted signal is expressed by $$e_t = E_t \cos\left(2\pi f_c t + \frac{\Delta f}{f_m} \cos 2\pi f_m t\right)$$

If this signal is continuously transmitted, the echo signal received from an object will be the same as the transmitted signal $$\frac{2R}{c}$$

seconds earlier  The received signal is then $$e_r = E_r \cos\left[2\pi f_c\left(t - \frac{2R}{c}\right) + \frac{\Delta f}{f_m} \cos 2\pi f_m\left(t - \frac{2R}{c}\right)\right]$$

If a portion of the transmitted signal $e_t$ is mixed with the received signal $e_r$, sum and difference frequency signals will be produced. The difference frequency signal is given by $$e_{diff.} = E_r K \cos\left[\frac{4\pi f_c R}{c} + 2\frac{\Delta f}{f_m} \sin \frac{2\pi f_m R}{c} \cos\left(2\pi f_m t - \frac{2\pi f_m R}{c}\right)\right]$$

For values of R less than 100 feet, and $f_m$ less than 100 kc.

$$\sin \frac{2\pi f_m R}{c} = \frac{2\pi f_m R}{c}$$

and $$\cos\left(2\pi f_m t - \frac{2\pi f_m R}{c}\right) = \cos 2\pi f_m t$$

The difference frequency signal can then be simplified to $$e_{diff.} = E_r K \cos\left(\frac{4\pi f_c R}{c} + \frac{4\pi \Delta f R}{c} \cos 2\pi f_m t\right)$$

This expression can be expanded through the use of Bessel functions to $$e_{diff.} = E_r K \left\{ J_0\left(\frac{4\pi \Delta f R}{c}\right) \cos \frac{4\pi f_c R}{c} \right.$$
$$- J_1\left(\frac{4\pi \Delta f R}{c}\right)\left[\sin\left(2\pi f_m t + \frac{4\pi f_c R}{c}\right)\right.$$
$$\left. - \sin\left(2\pi f_m t - \frac{4\pi f_c R}{c}\right)\right] + \cdots$$
$$+ (-1)^n J_n\left(\frac{4\pi \Delta f R}{c}\right)\left[\sin\left(2\pi n f_m t + \frac{4\pi f_c R}{c}\right)\right.$$
$$\left.\left. - \sin\left(2\pi n f_m t - \frac{4\pi f_c R}{c}\right)\right]\right\}$$

where the argument of the function is $$\frac{4\pi \Delta f R}{c}$$

Figure 2:
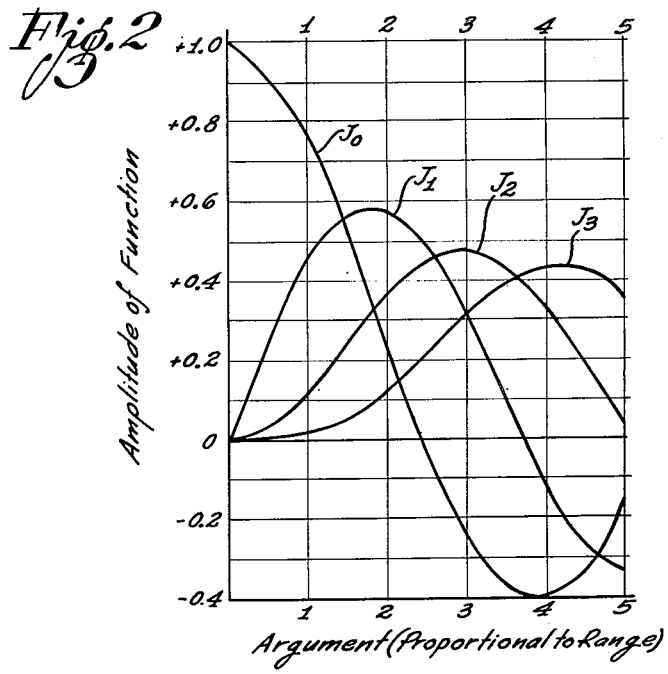
FIGURE 2 is an abbreviated graph of Bessel functions for the first four orders, used to illustrate particular frequency components treated in the system of FIGURE 1.

Bessel function curves are shown in FIGURE 2, where in reference to the instant invention, the argument value 1 corresponds to a range of 60 feet. That is, setting $\Delta f$ equal to 1.3 mc. and solving $$\frac{4\pi \Delta f R}{c} = 1$$

for R, yields $R = 60$. Sixty feet is chosen as the "hit" range in the present embodiment.

The frequency of the phase term $$\frac{4\pi f_c R}{c}$$

in the above Bessel expansion is $$\frac{1}{2\pi} \frac{d\left(\frac{4\pi f_c R}{c}\right)}{dt} = \frac{2f_c}{c} \frac{dR}{dt} = \frac{2f_c}{c} v$$

The frequency $$\frac{2f_c v}{c}$$

is the Doppler frequency $f_d$. Therefore, if $v$ is assumed to be constant, the phase term can be written $$\frac{4\pi f_c R}{c} = 2\pi f_d t$$

When this is done, it can be seen from the resulting expression that the difference frequency signal, at the output of the mixer 7, is composed of a number of signal components having the frequencies $f_d$, $f_m - f_d$, $f_m + f_d$, $2f_m - f_d$, $2f_m + f_d$, and so on to $nf_m - f_d$ and $nf_m + f_d$.

The amplitude of each such frequency component is proportional to the range-dependent Bessel function (as illustrated in FIGURE 2) and to the peak received signal strength, which also varies with the range. This second factor is evaluated as follows:

The power received from an object at range R in a radar system is $$P_r = \frac{P_t G_t G_r \lambda^2 \sigma}{(4\pi)^3 R^4}$$

If the same antenna is used for both transmitting and receiving, so that $G_r = G_t = G$, then the peak received signal strength is $$E_r = \frac{E_t G \lambda \sqrt{\sigma}}{(4\pi)^{3/2} R^2}$$

With the 225 megacycle transmitted signal radiating two watts of power and with an antenna impedance of 50 ohms, the peak received voltage is $$E_r \approx \frac{G\sqrt{\sigma}}{R^2}$$

Thus, the amplitude of the $n$th order frequency component of the difference frequency signal out of the receiver is $$e_{n(diff.)} = \frac{GK\sqrt{\sigma}}{R^2} J_n\left(\frac{4\pi \Delta f R}{c}\right) \quad (1)$$

Figure 3:
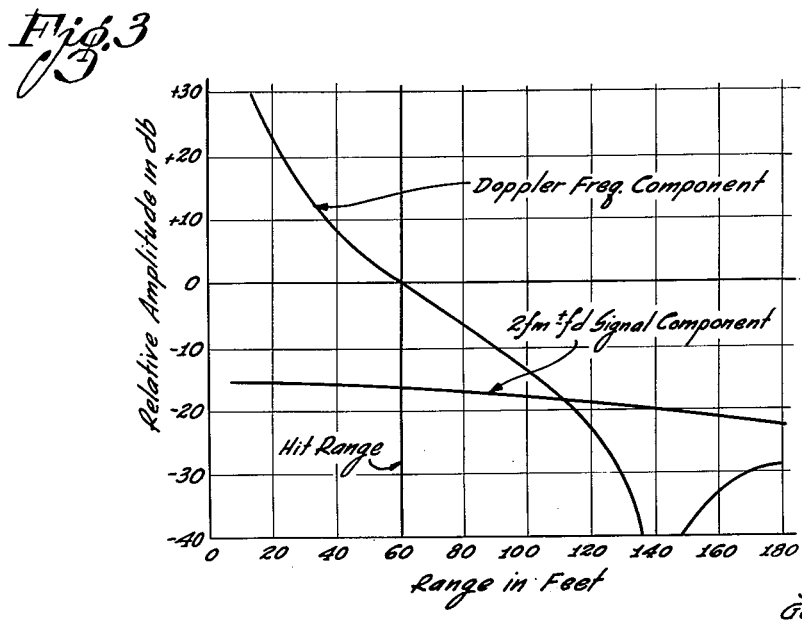
FIGURE 3 is a chart showing the relative received amplitudes of the Doppler frequency signal and the second sideband signal, with range, at the output of the mixer in FIGURE 1.
Figure 4:
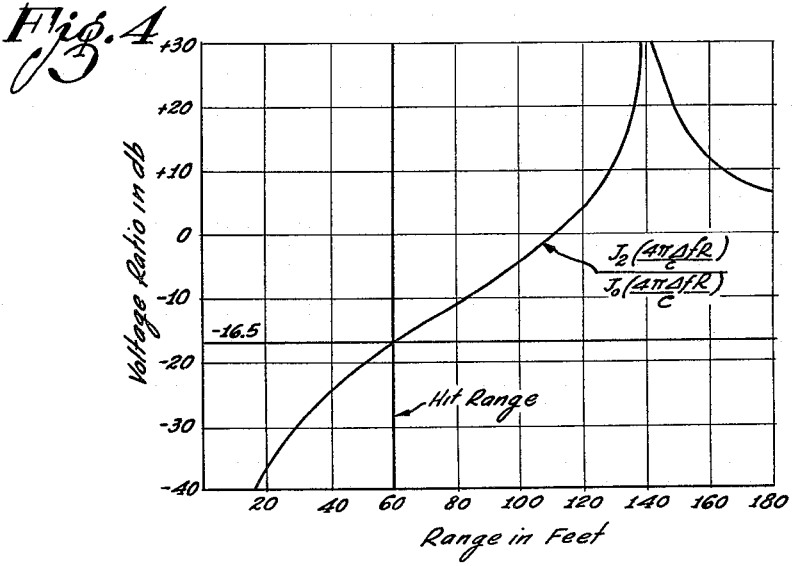
FIGURE 4 is a curve of the second-order to zero-order signal ratio of the two signals in FIGURE 3.

The relative amplitude of the zero and second order components, for example, as a function of range is illustrated in decibel form in FIGURE 3, in which (for simplicity) the value or amplitude of the zero order component ($J_0$) at a range of 60 feet is arbitrarily designated as the 0 db reference point. These curves are obtained by putting the above Equation 1 for any range R into decibel form relative to the zero order component power at an assumed range $R_0$, thus obtaining $$db = 20\left[\log \frac{J_n\left(\frac{4\pi \Delta f R}{c}\right)}{R^2} - \log \frac{J_0\left(\frac{4\pi \Delta f R_0}{c}\right)}{R_0^2}\right]$$

where the $R_0$ term is established by selecting $R_0$, and plotting the results for $J_0$ and $J_2$ of the first term at ranges up to 180 feet. Considerable fluctuation in the amplitude of these frequency components can occur due to variations in the antenna gain G and the missile (tracked object) back scattering cross section $\sigma$ during operation of the system under various conditions. These fluctuations make it impractical to measure range by means of the amplitude, only, of one of the signal components. However, the ratio of any two difference frequency components is independent of signal strength variations, being dependent only upon the ratio of the Bessel function of the two components. Stated in equation form, this is $$\frac{e_n}{e_m} = \frac{J_n\left(\frac{4\pi\Delta fR}{c}\right)}{J_m\left(\frac{4\pi\Delta fR}{c}\right)}$$

since the entire factor $$\frac{GK\sqrt{\sigma}}{R^2}$$

in the amplitude expression for each of the $n$th order frequency components cancels itself out when the ratio is taken. This ratio is shown in FIGURE 4 for the zero and second order components, and is obtained from FIGURE 3 by merely subtracting the $J_0$ curve from the $J_2$ curve since they are in logarithmic form.

Returning now to the description of the particular system in FIGURE 1, the output from the mixer 7, comprising the signals discussed above, passes through a 25 kilocycle trap 10 to remove the first sideband component $(f_m \pm f_d)$. The remaining signals are fed to a wide-band amplifier 11 which amplifies by about 60 db all frequencies from 50 c.p.s. to about 70 kc.

At the output of the wide-band amplifier 11, two predetermined signal frequency components are separated for further use by means of suitable filters in the plate circuit of the final amplifier stage, for example. In the preferred embodiment, a low pass filter 12 passes only the zero order component, which is the pure Doppler frequency alone, i.e., the $J_0$ term of the Bessel function series; and a band-pass filter 14 passes only the second order component, which is $2f_m \pm f_d$, i.e., the $J_2$ term of the Bessel function series. The reasons for this particular selection will be discussed later.

The second sideband signal is fed to a demodulator 15 where it is demodulated by injecting a 50 kc. wave, from a frequency doubler 16 connected to an output of the 25 kc. oscillator 2. After amplitude detecting, the resulting audio component at the Doppler frequency is obtained by filtering and presented at the output of the demodulator 15, thus providing an audio frequency signal which is amplitude proportional to the second sideband.

The Doppler frequency signal $J_0$ out of the low pass filter 12 is put into a first log audio amplifier 17, and the second sideband signal (at Doppler frequency) $J_2$ out of the demodulator 15 is put into a second, identical log audio amplifier 19. Each log amplifier 17 and 19 produces a D.C. output voltage signal proportional to the logarithm of the A.C. audio input amplitude over a 50 db range.

Figure 5:
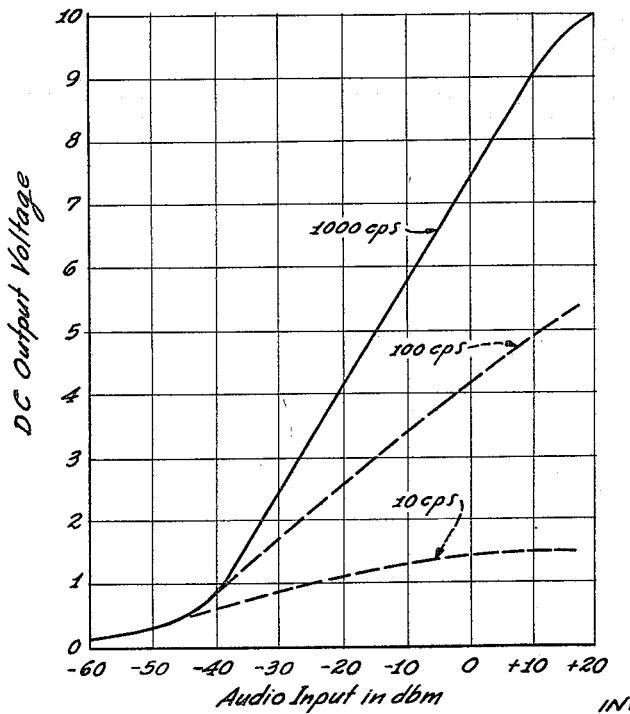
FIGURE 5 is a curve illustrating the output voltage characteristics of the log audio amplifiers in FIGURE 1.

The log audio amplifier performance characteristic is shown in FIGURE 5, where the solid-line curve represents amplifier response at the Doppler frequency of the missile being fired at the target carrying the system of the present invention, and the dotted-line curves are approximate and are shown for reference only. Actually, a particular embodiment of this invention is designed for missiles having a radial velocity (relative to the target) of about 1000 to 2000 feet per second. A 2,180 foot-per-second velocity produces a Doppler frequency of about 1000 c.p.s. in the 225 mc. carrier-frequency equipment installed in the target drone, as the missile is approaching.

Logarithmic amplifiers are known in the art, and any such design having a frequency response similar to that shown in FIGURE 5, with a linear volts per db range, is suitable for use herein. For example, reference is made to the logarithmic amplifier described by Chambers and Page in the August 1954 number of the Proceedings of the I.R.E.

The difference between the two D.C. output voltages of the log audio amplifiers 17 and 19 is, as has been referred to hereinbefore, dependent upon the ratio of the two input signals and is therefore dependent upon the range. It is important to realize that for a given range, this voltage difference will be constant regardless of input signal strength variations throughout the linear range of the log amplifiers.

Figure 6:
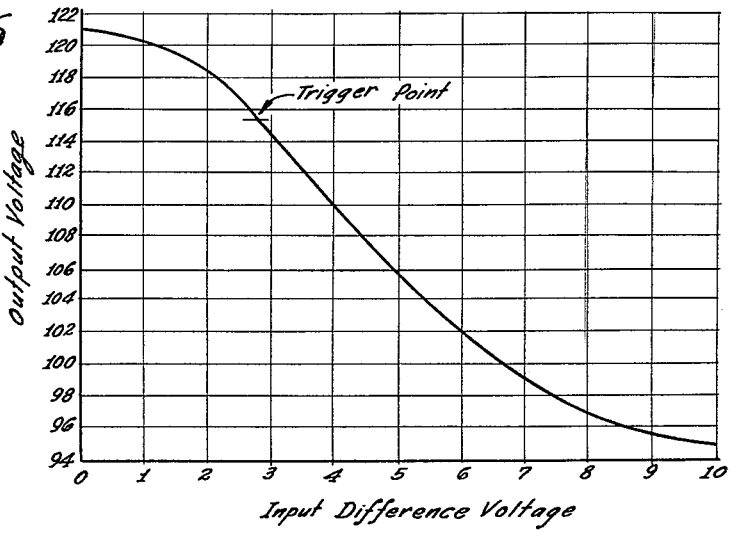
FIGURE 6 is a curve illustrating the characteristic performance of the difference amplifier in FIGURE 1.
Figure 7:
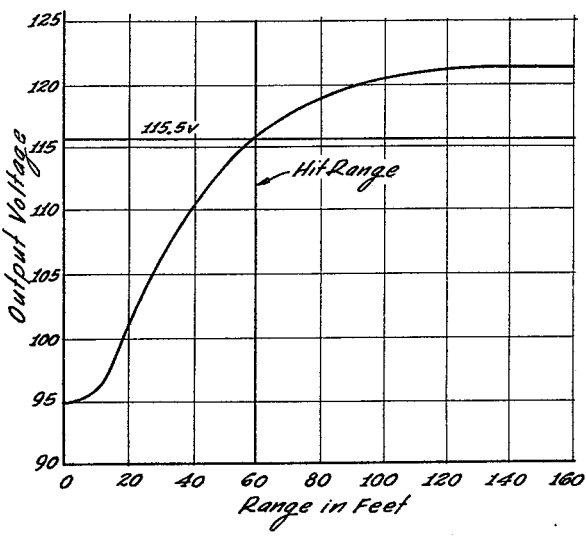
FIGURE 7 is a curve showing the difference amplifier output voltage as a function of range.

The two D.C. signals out of the log amplifiers 17 and 19 operate into two input circuits of a difference amplifier 20 which provides a D.C. output voltage in accordance with the input difference voltage, as shown in FIGURE 6. The difference amplifier output voltage as a function of range is shown in FIGURE 7, the curve of which is obtained directly from the information provided in FIGURES 4, 5, and 6. The structure of the difference amplifier 20 is also conventional and need not be described.

A Schmitt trigger circuit 21 is connected to the output of the difference amplifier 20, and is set to be triggered when the D.C. output voltage of the difference amplifier falls below the value corresponding to the desired "hit" range. In the present embodiment, this is at 115.5 volts, which signifies that the missile has closed to within 60 feet of the target drone.

Triggering of the Schmitt trigger circuit 21 fires a thyratron 22 in a control circuit which in turn energizes a relay 24. Actuation of the relay 24 advances a stepping switch 25 one position to fire one of a plurality of flares 26 from the target, to thus indicate a hit. Actuation of the relay 24 also starts a 10-second time delay circuit 27 which immediately opens the plate circuit of the thyratron 22 and automatically closes it again in 10 seconds to reset for the next hit. The purpose of the latter circuit is to prevent a single missile from possibly causing multiple hit indications in case the thyratron 22 would be repeatedly triggered in quick succession while the missile is still within the 60-foot range.

Of course, various different means for hit indication could be employed without departing from the principles of our invention or sacrificing any of its advantages. For instance, smoke puffs could be substituted for the flares 26, or the hit information could be telemetered to the ground, or indicated in any other suitable manner.

It is thus seen that the present invention differs from all other distance indicators using a reflected FM radio wave, in that the ratio of one of the sideband components of the modulating frequency in the mixed received signal to the zero order component is measured. The zero order component is the Doppler frequency alone, which is separated from the rest of the entire spectrum by the low pass filter 12. It is here noted that it would be entirely possible to find the range of an object by measuring the ratio of any two of the sideband components $J_1$, $J_2$, $J_3$, etc., but for the purpose of measuring and indicating when the closest approach distance of a missile to a target is within a predetermined "hit" range, the production (or isolation) and use of the $J_0$ component, as one of the two quantities from which a ratio is determined, results in definite advantages and enables a practical system to be employed.

One of these advantages that will be immediately recognized from the present disclosure is a "sharp range cutoff," independent of signal strength variations. From the partial graph of Bessel functions in FIGURE 2, and considering that the range values which one would be interested in are between 0 and 2 or perhaps 2.5, the curves $J_1$, $J_2$, etc. are somewhat parallel although displaced somewhat. This means that if the ratio $J_2/J_1$, for example, is being measured, this ratio is changing only slightly in the important region as the range decreases. However, the ratio of $J_1/J_0$, or $J_2/J_0$, for example, changes radically in the indicated region, and is thus a vastly superior ratio to measure. Since $J_0$ crosses the other three curves at substantially a right angle, there can not be a substantial error in range determination, and there can not be a missile which closes nearer than the range selected for a hit without the system inherently giving a positive and immediate indication of this fact.

Another exclusive advantage of using the $J_0$ term is that the resulting system is insensitive to and discriminates against stationary or slow moving objects. This is because there would be a low Doppler frequency $f_d$, or none at all, and the log audio amplifiers 17 and 19 do not respond sufficiently at low input frequencies to produce the required difference-voltage output to the difference amplifier 20, which is about 2.5 to 3 volts in the present embodiment. To illustrate, using the $-16.5$ db voltage ratio necessary at the log amplifier inputs to trigger this system, a 16.5 db difference on the abscissa of FIGURE 5, even if a 100 c.p.s. Doppler frequency existed, would produce a maximum difference voltage of only about 1⅓ volts. Thus the object to be measured must be at a relatively high velocity to affect the output of the present invention.

The present narrow band hit-miss detector also exhibits the extremely desirable characteristics of simplicity, small size, weight and power consumption, with resultant low cost.

The most critical part of this system in operation is the frequency deviation $\Delta f$ of the transmitter 1. This must be held substantially constant, since the cut-off range is directly affected by the frequency deviation. On the other hand, slow variations of the transmitter carrier frequency $f_c$ and modulating frequency $f_m$ do not affect the range cut-off characteristics of the system. Thus, any desired modification of the "hit" range (60 feet in the present embodiment) is easily accomplished by adjusting the frequency deviation $\Delta f$.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A hit detector system comprising means for transmitting and radiating a frequency-modulated radio-frequency carrier wave, means for receiving said wave directly and after reflection from a missile fired at said transmitting means, means for mixing said direct and reflected waves to provide sum and difference signals having various frequency components including the zero order component of the modulating frequency, which is the Doppler frequency, means for separating the latter Doppler frequency from the mixed waves, means for separating the sideband of one of the higher order or harmonic frequency components of the modulating frequency from said mixed waves, and means for providing a signal proportional to the amplitude ratio of the two separated components, thereby providing a signal corresponding to the instantaneous range of the missile in the vicinity of the transmitting means.

2. Apparatus in accordance with claim 1 including triggering means for giving an output indication when said ratio reaches a value corresponding to a predetermined hit range.

3. A hit detector system comprising means for transmitting a frequency-modulated carrier wave with a constant frequency deviation, means for receiving said wave directly and after reflection from a high-speed missile fired at said transmitting means, means for mixing said direct and reflected waves, and means for providing a signal proportional to the amplitude ratio of the zero order frequency component, alone, in the mixed waves, and the sideband of one only of the higher order frequency components in said mixed waves, whereby an accurate range measurement signal is produced regardless of received signal strength variations.

4. Apparatus in accordance with claim 3 wherein said means for providing said ratio signal includes a first logarithmic amplifier receiving only an A.C. signal proportional to the sideband amplitude of said higher order component, a second logarithmic amplifier receiving only an A.C. signal proportional to the amplitude of said zero order component, said logarithmic amplifiers respectively producing a D.C. output signal proportional to the logarithm of their inputs, and a dual-input difference amplifier connected to the outputs of said log amplifiers for providing a D.C. output signal proportional to the input difference signal thereto, and a trigger circuit connected to be actuated by a specified value of the difference amplifier output, said log amplifiers having a low gain at low input frequencies, whereby said system discriminates against slow moving and stationary objects by insufficient voltage difference at said difference amplifier to actuate said trigger circuit.

5. A hit detector system for use during firings of high-speed missiles at a target, comprising: a frequency-modulated transmitter and antenna adapted to radiate an FM wave toward the missile, receiving means adjacent to said transmitter and adapted to receive said FM wave directly from said transmitter and after reflection from said missile, said receiver further including a mixer for combining said direct and reflected waves to thus provide sum and difference signals having frequencies harmonically related to the modulating frequency of said transmitter and including the Doppler frequency, and means for measuring the miss-distance of said missile as a function of the amplitude ratio of the sideband of one of said harmonic frequencies at least as high as the first order and said Doppler frequency signal.

6. Apparatus in accordance with claim 5 including a low pass filter through which signals from said mixer are passed, said low pass filter having a cut-off above said Doppler frequency and below said modulating frequency, a band-pass filter through which signals from said mixer are also passed in parallel with said low pass filter, said band-pass filter passing only said one harmonic of said modulating frequency and its sidebands, a demodulator into which the signal from said band-pass filter is fed, to provide a signal at the Doppler frequency which is amplitude proportional to the sideband passed by said band-pass filter, and means for measuring the ratio of the demodulator output signal and the low pass filter output signal.

7. Apparatus in accordance with claim 6 wherein said latter means comprises a first logarithmic amplifier connected to the output of said low pass filter, a second and identical logarithmic amplifier connected to the output of said demodulator, and a difference amplifier connected to the outputs of both said logarithmic amplifiers.

8. Apparatus in accordance with claim 7 including means for indicating when the miss-distance of said missile is within a predetermined hit range comprising a trigger circuit connected to the output of said difference amplifier and having an output trigger signal when the difference signal input thereto reaches a value corresponding to said hit range, and output signal actuating means connected to be actuated by said trigger circuit.

9. Apparatus in accordance with claim 8 wherein said actuating means comprises electro-mechanical driving means for serially releasing a plurality of visual objects.

10. A miss-distance indicating system comprising a frequency-modulated transmitter for radiating an FM wave with a constant frequency deviation, a receiver mounted adjacent said transmitter and including mixer means for combining waves received directly from said transmitter with the same waves received after radiation from said transmitter and back reflection from an approaching missile whose miss-distance is to be compared with a predetermined hit range, a low pass filter for separating only the resulting Doppler frequency component from said mixer, a band-pass filter with its input connected in parallel with said low pass filter for separating only one of the remaining frequency components from said mixer which centers around an integral multiple of the modulating frequency of said transmitter, means for producing a signal proportional to the amplitude ratio of the sideband of said modulating frequency multiple from said band-pass filter and said Doppler frequency from said low pass filter, and means responsive to said ratio signal for indicating when said ratio signal reaches a value corresponding to a predetermined hit range.

11. A miss-distance detector device comprising means for transmitting a frequency-modulated wave, means for receiving said wave directly and after reflection from a missile fired at a target, means for mixing said direct and reflected waves, and means for providing a signal proportional to the amplitude ratio of the second order frequency sideband signal component in said mixed waves to the zero order frequency signal component in said mixed waves.

12. Apparatus in accordance with claim 11 wherein said latter means comprises means for passing only said zero order component, means for passing only said second order component, means for demodulating said second order component, means for obtaining a logarithmic signal from said zero order and demodulated components respectively, and means for subtracting said logarithmic signals.

13. Apparatus in accordance with claim 12 including output actuating means, and means for triggering said actuating means when the difference signal reaches a predetermined value corresponding to the desired hit range.

References Cited in the file of this patent
UNITED STATES PATENTS

| | | |
|---|---|---|
| 2,453,169 | Varian | Nov. 9, 1948 |
| 2,907,023 | Skinner | Sept. 29, 1959 |
| 2,931,030 | Rey | Mar. 29, 1960 |